(12) United States Patent
Babej et al.

(10) Patent No.: US 8,864,429 B2
(45) Date of Patent: *Oct. 21, 2014

(54) FUNCTIONAL ELEMENT FOR THE ATTACHMENT TO A SHEET METAL PART, COMPONENT ASSEMBLY MANUFACTURED FROM THESE AND ALSO A METHOD FOR THE ATTACHMENT OF THE FUNCTIONAL ELEMENT TO A SHEET METAL PART

(75) Inventors: Jiri Babej, Lich (DE); Wolfgang Hoessrich, Kronberg (DE)

(73) Assignee: Profil Verbindungstechnik GmbH & Co. KG, Friedrichsdorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/589,051

(22) Filed: Aug. 17, 2012

(65) Prior Publication Data

US 2012/0308329 A1 Dec. 6, 2012

Related U.S. Application Data

(60) Division of application No. 12/890,600, filed on Sep. 24, 2010, now Pat. No. 8,261,422, which is a continuation of application No. 11/943,769, filed on Nov. 21, 2007, now abandoned, which is a division of application No. 10/475,444, filed as application No. PCT/EP02/04365 on Apr. 19, 2002, now Pat. No. 7,318,696.

(30) Foreign Application Priority Data

Apr. 20, 2001 (DE) .................................. 101 19 505

(51) Int. Cl.
*F16B 37/04* (2006.01)

(52) U.S. Cl.
USPC ............................................ 411/181; 411/501

(58) Field of Classification Search
USPC ................................................... 411/179–181
See application file for complete search history.

(56) References Cited

U.S. PATENT DOCUMENTS

| | | | | |
|---|---|---|---|---|
| 2,544,304 | A | * 3/1951 | Eckenbeck et al. | ........... 411/180 |
| 3,014,609 | A | * 12/1961 | Hobbs | .............. 29/509 |
| 3,117,611 | A | * 1/1964 | Matthews | ...... 411/103 |
| 3,276,499 | A | * 10/1966 | Reusser | ........ 411/179 |

(Continued)

FOREIGN PATENT DOCUMENTS

| | | |
|---|---|---|
| DE | 34 47 006 | 6/1988 |
| DE | 38 35 566 A1 | 5/1989 |

(Continued)

*Primary Examiner* — Gary Estremsky
(74) *Attorney, Agent, or Firm* — Hershkovitz & Associates, PLLC.; Abraham Hershkovitz; Eugene Rzucidlo

(57) ABSTRACT

A functional element (10), for fixing to a piece of sheet metal (40), such as for example, a nut element or a bolt element with a body section or head section, comprising an annular flange (14) which transforms into a cylindrical rivet section, is characterized in that the transformation from annular flange into the rivet section is formed by an at least essentially conical surface, forming a contact surface for a corresponding conical region of a piece of sheet metal, which, on fixing the functional element to a piece of sheet metal, is clamped between the side of the annular flange facing the rivet section and an annular bead (50) formed from the rivet section. An assembled component and a method for the fixing of a functional element are also disclosed.

4 Claims, 6 Drawing Sheets

(56) References Cited

U.S. PATENT DOCUMENTS

| | | | |
|---|---|---|---|
| 3,399,705 A * | 9/1968 | Breed et al. | 411/180 |
| 3,434,521 A * | 3/1969 | Flora | 411/180 |
| 4,000,680 A * | 1/1977 | Briles | 411/507 |
| 4,739,601 A | 4/1988 | Beine | |
| 4,802,803 A | 2/1989 | Muller | |
| 5,309,618 A * | 5/1994 | Muller | 29/432.2 |
| 5,365,654 A * | 11/1994 | Moulton | 29/761 |
| 5,439,336 A * | 8/1995 | Muller | 411/179 |
| 5,445,483 A * | 8/1995 | Fultz | 411/181 |
| 5,564,873 A | 10/1996 | Ladouceur et al. | |
| 5,580,202 A * | 12/1996 | Luhm | 411/507 |
| 5,680,690 A * | 10/1997 | Briles et al. | 29/458 |
| 5,713,706 A | 2/1998 | Lozano | |
| 5,722,139 A * | 3/1998 | Ladouceur et al. | 29/34 R |
| 6,637,994 B2 * | 10/2003 | Leistner | 411/181 |
| 7,318,696 B2 * | 1/2008 | Babej et al. | 411/181 |
| 7,657,614 B2 * | 2/2010 | Gyorfi et al. | 709/220 |
| 7,685,690 B2 | 3/2010 | Ghiran | |
| 7,698,798 B2 | 4/2010 | Toosky | |
| 7,866,929 B2 * | 1/2011 | Babej et al. | 411/107 |
| 7,878,746 B2 | 2/2011 | Babej | |
| 7,988,394 B2 | 8/2011 | Babej et al. | |
| 8,021,091 B2 | 9/2011 | Bentrim | |
| 8,083,451 B2 * | 12/2011 | Babej et al. | 411/179 |
| 2005/0158142 A1 | 7/2005 | Babej et al. | |
| 2008/0145176 A1 | 6/2008 | Babej et al. | |

FOREIGN PATENT DOCUMENTS

| | | |
|---|---|---|
| DE | 4239584 A1 | 5/1994 |
| EP | 0539793 A1 | 5/1993 |
| EP | 0713982 A2 | 5/1996 |
| EP | 0922866 A2 | 6/1999 |
| EP | 1497073 B1 | 1/2005 |

* cited by examiner ved by the contact surface of the functional element and the ring bead stands under a compressive pressure and is thus particularly protected against fatigue cracks. Even with alternating loadings the compressive stress in the sheet metal part

FUNCTIONAL ELEMENT FOR THE ATTACHMENT TO A SHEET METAL PART, COMPONENT ASSEMBLY MANUFACTURED FROM THESE AND ALSO A METHOD FOR THE ATTACHMENT OF THE FUNCTIONAL ELEMENT TO A SHEET METAL PART

CROSS REFERENCE TO RELATED APPLICATIONS

This application is a divisional of U.S. patent application Ser. No. 12/890,600, filed on Sep. 24, 2010, which is a continuation of U.S. patent application Ser. No. 11/943,769, filed on Nov. 21, 2007, which is a divisional application of U.S. patent application Ser. No. 10/475,444, filed on Mar. 23, 2004, now U.S. Pat. No. 7,318,696 B2 issued on Jan. 15, 2008 which claims priority to PCT/EP02/04365 filed on Apr. 19, 2002 and to German Patent Application No. 101 19 505.2 filed Apr. 20, 2001, the disclosures of all of which are expressly incorporated by reference herein in their entireties.

FIELD OF THE INVENTION

The present invention relates to a functional element for the attachment to a sheet metal part, such as for example a nut element or bolt element with a body portion or head portion which has a ring flange and also a component assembly manufactured from the functional element and a sheet metal part and a method of attachment of the functional element to a sheet metal part.

A functional element of the initially named kind is offered by Profil Verbindungstechnik GmbH & Co. KG, Friedrichsdorf, Germany under the designation EMF in the form of a nut element. This element permits a component to be attached to the side of the sheet metal part remote from the ring flange and indeed by means of a threaded bolt which engages into the thread of the nut element and clamps the component and the sheet metal part against one another. The element is attached to a sheet metal part by means of the method which is described in EP-A-0 713 982 in conjunction with its FIGS. 16 and 17, with this method being claimed per se in the corresponding European Divisional Application EP-A-0 922 866. A functional element of the initially named kind in the form of a bolt element is likewise known and indeed in the form of the so-called SBF bolt element of the company Profil Verbindungstechnik GmbH & Co. KG which, amongst other things, is described in the German patent 34 47 006 together with the associated attachment process. Both the EMF element and also the SBF element have proved themselves in practice. With the EMF element the sheet metal part is only insignificantly deformed and remains at least substantially in the same plane as the surrounding sheet metal material in the region of attachment of the functional element.

In contrast, with the SBF bolt, a rounded recess is produced in the sheet metal part and this leads to a relatively stiff connection of the bolt element to the sheet metal part.

The object of the present invention is to provide a functional element which ensures a particularly stiff attachment of the sheet metal part, so that not only tension and compression forces can be transmitted via the element of the sheet metal part but rather also transverse and shear forces, with the attachment also being intended to have a long working life even with alternating loading and not to have a tendency to the formation of the fatigue cracks. Furthermore, the invention intends to provide a component assembly comprising the functional element and the sheet metal part which has corresponding characteristics and to make available a method for the attachment of the functional element which ensures a high quality attachment of the functional element to the sheet metal part, without being particularly complicated in its realization.

BRIEF SUMMARY OF THE INVENTION

In this application the designation "functional element" has its normal meaning, the examples for such functional elements are fastener elements such as nut elements or bolt elements which enable the attachment of a further component to a sheet metal part. The designation however also includes all types of hollow elements which serve for example for the reception of inserted parts or as a rotatable mounting for a shaft, as well as all elements which are provided with a shaft part, for example for reception of a clip or for the rotatable mounting of a hollow part.

In order to satisfy the object a functional element of the initially named kind is provided in accordance with the invention which is characterized in that the transition from the ring flange into the rivet section is formed by an at least substantially conical surface, which forms a contact surface for a corresponding conical region of a sheet metal part, which on attachment of the functional element to a sheet metal part is trapped between the side of the ring flange adjacent the rivet section and a ring bead formed from the rivet section.

A corresponding component assembly is characterized in that the transition from the ring flange into the rivet section is formed by an at least substantially conical surface which forms a contact surface for the sheet metal part, in that the sheet metal part has a conical region which contacts the conical contact surface of the functional element, with the conical region of the sheet metal part being clamped between the side of the ring flange adjacent the rivet section and a ring bead formed from the rivet section.

This embodiment of the functional element or of the component assembly formed with the functional element thus leads to a construction in which the conical region of the sheet metal part is clamped between the side of the ring flange adjacent the rivet section and a ring bead formed out of the rivet section. This construction provides a particularly stiff and firm attachment of the functional element to the sheet metal part and thus satisfies the above recited statement of the underlying object.

It is particularly favourable when the conical region of the sheet metal part moreover contacts the conical contact surface of the functional element since this contact and the clamped reception of the conical region of the sheet metal part between the ring flange and the ring bead leads to the element so to say supporting the sheet metal part over its full area, so that relative movements between the sheet metal part and the element are extensively precluded. This also increases the stiffness of the connection and helps to avoid the formation of fatigue cracks.

It is particularly favourable when features providing security against rotation are provided in the region of the conical surface, since the sheet metal material can be brought into engagement with these features providing security against rotation, whereby the security against rotation is achieved without reducing the stiffness of the connection. Moreover, in the region of the features providing security against rotation no fatigue cracks of the sheet metal part need be feared because the sheet metal material which is clampingly received by the contact surface of the functional element and the ring bead stands under a compressive pressure and is thus particularly protected against fatigue cracks. Even with alternating loadings the compressive stress in the sheet metal part is sufficient to suppress the formation of fatigue cracks. The features providing security against rotation can, for example, advantageously have the form of noses and/or recesses.

The axial length of the conical surface should preferably correspond at least approximately to the sheet metal thickness. A dimension of this kind ensures that the conical region is sufficiently long to achieve the desired stiffness.

The enclosed cone angle of the conical surface preferably lies in the range between 80° and 120° and amounts in particular to 90°.

It is particularly favourable when the conical surface merges via a cylindrical throat part into the rivet section. This throat part is essentially not deformed during the reforming of the material of the functional element in the region of the rivet section and forms a part of the clamping recess for the sheet material in the region of the rim of the hole provided in it. The throat part can with advantage have an axial length which corresponds approximately to the sheet metal thickness and is preferably somewhat larger than this.

The axial thickness of the ring flange can be made smaller than the thickness of the sheet metal part to which the element is to be secured. This is for example favourable with relatively thick sheet metal parts because the ring flange can be so pressed into the sheet metal material during the attachment to the sheet metal part that the side of the ring flange remote from the sheet metal part is flush with the plane of the sheet metal part or slightly recessed relatively to the latter.

The possibility however also exists of making the axial thickness of the ring flange substantially larger than the thickness of the sheet metal part to which the element is to be secured. In this case the side of the ring flange remote from the sheet metal part stands considerably in front of the corresponding side of the sheet metal part and can for example be exploited to realize a spacer function. In both cases the ring flange can be made with a relatively large diameter so that in total a large support surface is present between the functional element and the sheet metal part, whereby a favourable surface pressure is achieved and the transmission of forces into the sheet metal part via the functional element can be favoured. Particularly preferred embodiments of the functional elements and also of the component assembly can be found in the subordinate claims.

A method for the attachment of the functional element to a component assembly is disclosed herein. As an alternative, the attachment can take place with a method which is essentially known per se from the German patent 34 47 006, with the shape of the die being adapted to the special shape of the sheet metal part and of the functional element respectively.

The invention will now be explained in more detail in the following with reference to the embodiments and to the drawings which show:

DETAILED DESCRIPTION OF THE INVENTION

Figure 1:
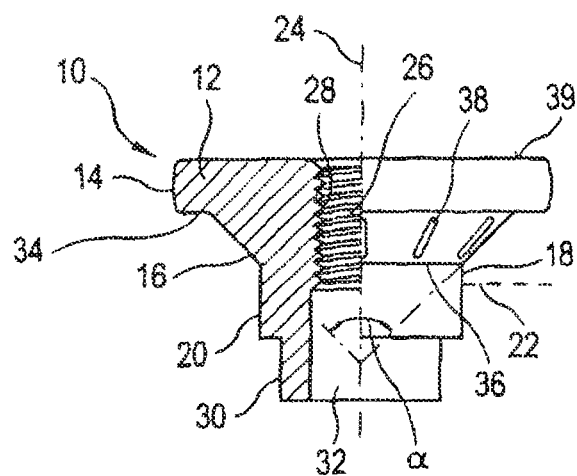
FIG. 1 a functional element in the form of a nut element partly sectioned in the axial direction, FIG. 2 a schematic representation of a sheet metal part which has been prepared to receive the functional element of FIG. 1, FIG. 3 a component assembly which is formed from the functional element of FIG. 1 and the sheet metal part of FIG. 2, FIG. 4 a side view of a functional element in the form of a bolt element which is partly sectioned in the longitudinal direction, FIG. 5 an end view of the bolt element of FIG. 4 in accordance with the arrow direction V of FIG. 4, FIG. 6 a perspective representation of the bolt element of FIGS. 4 and 5, FIG. 7 a partly sectioned representation of a component assembly which is formed from the bolt element of FIGS. 4 to 6 and a sheet metal part in accordance with FIG. 2, FIG. 8 a view of a further functional element in accordance with the invention seen from the underside, FIG. 9 a side view of the functional element of FIG. 8 with the left half of the representation being sectioned in the axial direction and with the element being shown above the sheet metal part which is pierced by the element, FIG. 10 the assembly situation after the attachment of the function element of FIG. 9 to the sheet metal part shown there, FIG. 11 a perspective representation of the functional element of FIG. 8.

FIG. 1 shows a functional element 10 with a one-piece body portion 12 which has a ring flange 14 which merges via a conical surface 16 and a throat part 18 into a rivet section 20. The boundary between the throat part 18 and the rivet section 20 lies at 22. The body 16 of the functional element 10 has moreover a bore 26 arranged concentric to the longitudinal axis 24 with a thread cylinder 28. At the lower end of the rivet section 20 in FIG. 1 the latter merges into a cylindrical extension 30 which can be considered as belonging to the rivet section 20. The bore 28 of the nut element 10 has a region 32 in the region of the cylindrical extension 30 with a diameter which is fractionally larger than the base diameter of the thread cylinder 28.

The conical surface 16 extends specifically between a ring-like underside 34 of the ring flange 14 which belongs to the support surface of the functional element up to the boundary 36 to the throat part 18 and has a cone angle $\alpha$ in this example of 90°. Features providing security against rotation, which here have the shape of noses, are uniformly distributed around the conical surface and extend respectively in axial planes of the element. Here eight such noses 38 providing security against rotation are provided, there could however be more or fewer of them. The noses providing security against rotation could also have the form of recesses.

Figure 2:
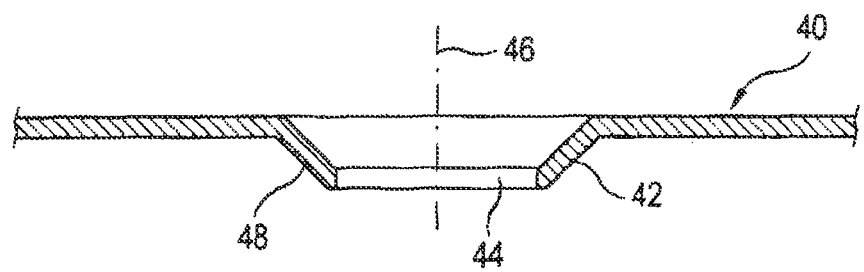

FIG. 2 shows a sheet metal part 40 which has been prepared to receive the functional element 10 of FIG. 1. Specifically, the sheet metal part 40 has a conical recess 42 with a hole 44 in the base region of the conical recess. The cone angle of the conical recess 42 of the sheet metal part 40 corresponds to the cone angle $\alpha$ of the conical surface 16 of the functional element 10. The hole 44 has a diameter which corresponds to the diameter of the throat part 18 of the functional element 10 of FIG. 1. The hole 44 can also have a somewhat larger diameter, for example in the range of 0.2 mm larger, in order to enable an easy introduction of the functional element into the hole. It would also be conceivable to make the hole 44 slightly smaller than the diameter of the throat part 18, whereby the hole 44 is slightly dilated on introducing the throat part 18 through it. The conical shape of the conical recess 42 in any event facilitates the alignment of the functional element 10 with the sheet metal part during the introduction of the functional element. The axis 46 of the hole 44 is thereby aligned with the longitudinal axis 24 of the functional element 10.

The sheet metal preparation normally takes place in a press or in a station of progressive tooling. In a further press, or in the same press, or in a further station of progressive tooling the functional element 10 is then introduced into the sheet metal part 40 using a setting head and attached to the sheet metal part, with the resulting component assembly being shown in FIG. 3 and subsequently being explained in more detail. It should briefly be brought out, that the attachment of the functional elements to sheet metal parts in presses and in progressive tooling or using robots or special frame devices is well known per se and is not explained in detail here.

Figure 3:
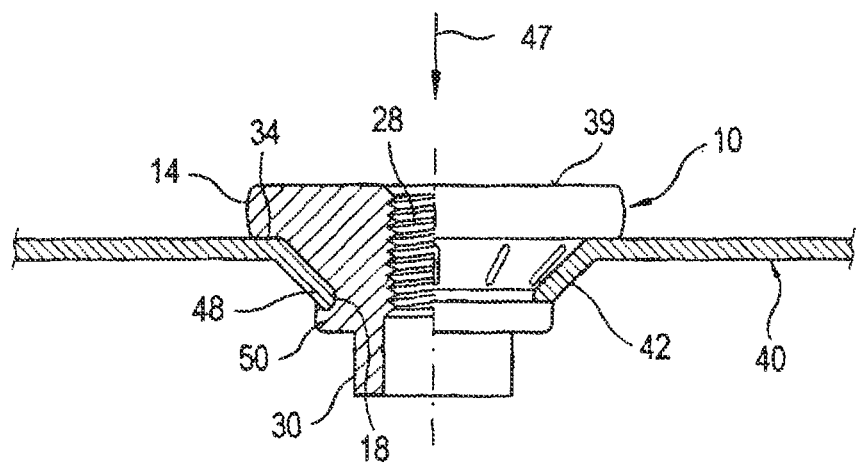
Figure 4:
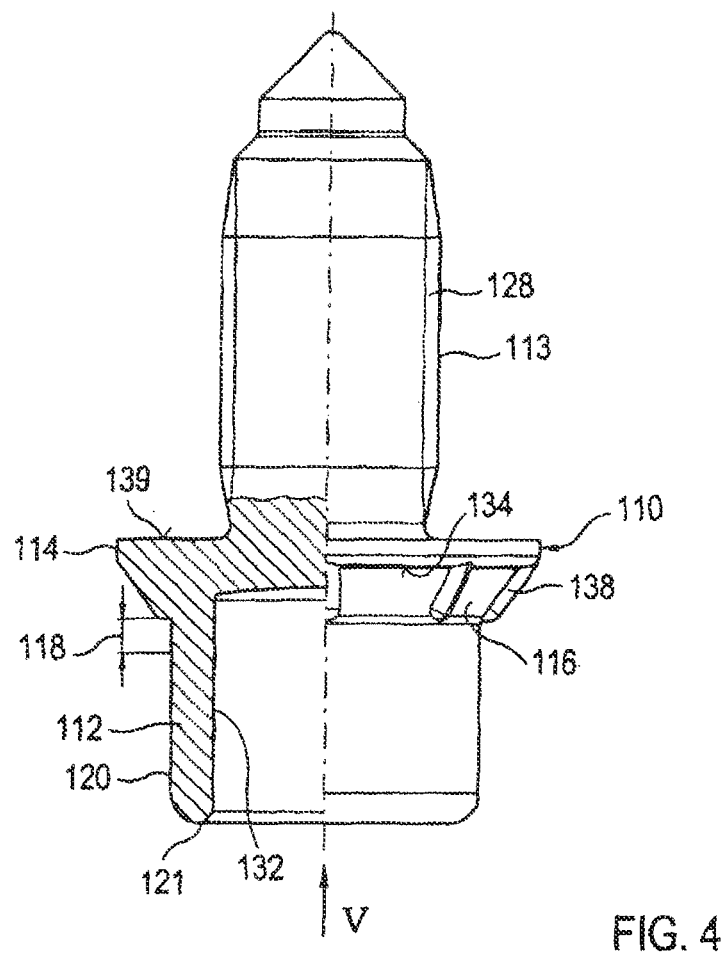
Figure 5:
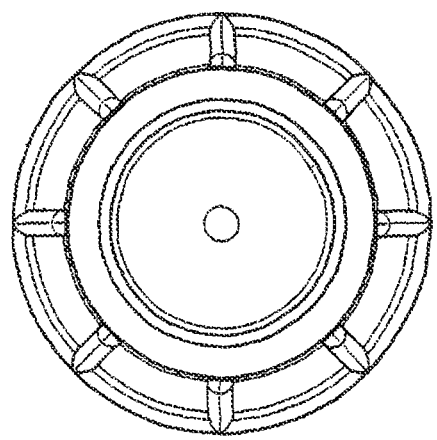
Figure 6:
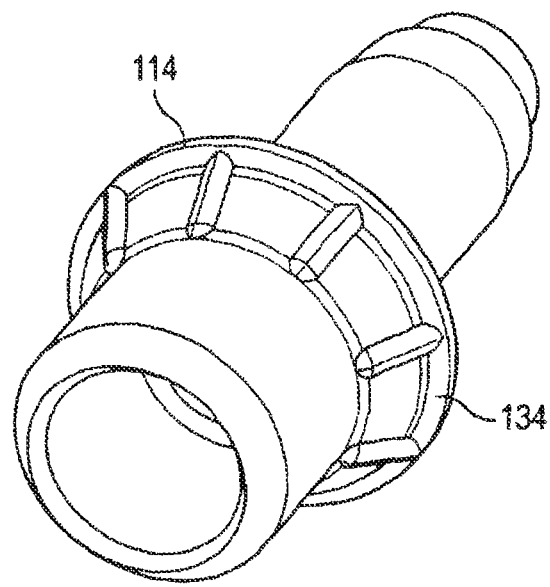

The component assembly situation in accordance with FIG. 3 allows it to be seen that a ring bead 50 is formed from the rivet section 20 of a functional element by the displacement of material of the rivet section in the direction towards the ring flange 14. This ring bead 50 forms, together with the throat part 18, which is only slightly deformed during the displacement of the material of the rivet section for the formation of the ring bead 50, a clamping recess for the rim region 48 of the hole 44 of the sheet metal part 40 and leads in other respects to the sheet metal material being set under a compressive pressure in the conical recess 42, in the region between the ring-like support surface 34 of the functional element and the clamping recess for the rim region 48 of the hole of the sheet metal material formed between the ring bead 50 and the throat part 18. Although not shown here the displacement of the material of the rivet section in the direction towards the ring flange 14 takes place in a die which has a conical recess which enters into contact with the outer side of the conical region 42 of the sheet metal part, so that the sheet material is simultaneously pressed radially inwardly, whereby a form-fitted engagement arises between the sheet material in the conical region 42 and the features 38 providing security against rotation.

During the displacement of the material out of the region of the rivet section towards the ring flange a pressure is exerted from above in the arrow direction 47 onto the end face 39 of the functional element 10. As relatively much material is present in the body portion 12 of the functional element between the end face 39 and the rivet section, this region of the functional element is not deformed, so that a deformation of the thread cylinder 28 is not to be feared. The cylindrical extension 30 of the rivet section is also not deformed during the attachment of the functional element but rather is simply guided in a bore of the (not shown) die.

The component assembly in accordance with FIG. 3 has amongst other things the advantage that a further component can be attached to the one or other side. For example a component can be secured to the end face 39, in this case by means of a bolt which is screwed into the thread cylinder 28 coming from the top in FIG. 3. Through the conical form of the region 42 of the sheet metal part and the formation of the ring bead 50 the attachment of the functional element of the sheet metal part is so firm or stiff that the attachment of a component to this end face 39 is straightforwardly permissible. In this connection the height of the ring flange 14, i.e. the axial thickness of the ring flange 14 can be selected in order to ensure a spacer function between the further component and the sheet metal part 40.

The possibility however also exists of attaching a component to the lower side of the sheet metal part 40 in FIG. 3. In this case the bolt should be introduced into the thread cylinder 28 from below. The component could be supported on the underside of the sheet metal part opposite to the ring flange 14 or at the lower side of the ring bead 50 or, with suitable dimensioning of the cylindrical projection 30, at the free end face of this projection. The cylindrical projection 30 could also serve as a bearing surface for a rotatable part, which is likewise secured with a bolt which is introduced into the thread cylinder 28 coming from below.

The FIGS. 4 to 7 show a further example of a functional element in accordance with the invention, here in the form of a bolt element.

For the following description the same reference numerals will be used for parts which have the same form or function as in the nut element of FIGS. 1 to 3, but are increased by the basic number 100. It can be assumed that the previous description also applies for the correspondingly characterized parts of the embodiment of FIGS. 4 to 7, unless something is stated to the contrary.

The bolt element 110 has a head part 112 which corresponds at least substantially to the body portion 12 of the nut element of FIG. 1 and the bolt element has moreover a shaft part 113 which extends away from the upper side 139 of the ring flange 114. The shaft part 113 carries a thread cylinder 128.

In this example the ring flange 114 merges via a ring-like support surface 134 into a conical contact surface 116 which merges directly into a rivet section 120, which is here equipped with piercing and riveting features at its lower end 121, which are in principle identical to the piercing and riveting features in a customary SBF bolt. I.e. one can image the bolt element of FIGS. 4 to 7 in such a way that now no throat part is provided, which is basically also possible in the design of the functional element in accordance with FIGS. 1 to 3. On the other hand, the upper region 118 of the piercing and riveting section 120 is here at least substantially not deformed, as can be seen from FIG. 7, so that this region can optionally be termed a throat part.

In similar manner to the embodiment of FIGS. 1 to 3 features 138 providing security against rotation are provided here which here have the shape of noses. In distinction to the design of the nut element of FIGS. 1 to 3 the noses 138 extend over the entire axial length of the conical surface 116 and run out into the lower side 134 of the ring flange 114 and also into the throat region 118. A corresponding design of the noses 38 providing security against rotation in the embodiment of FIGS. 1 to 3 would also be possible. It would also be possible to replace the noses 138 providing security against rotation in accordance with FIGS. 4 to 7 with recesses providing security against rotation which should then be correspondingly designed, as in the embodiment of FIGS. 1 to 3. One notes in this example that the axial thickness of the ring flange 114 is here made substantially smaller than in the embodiment of FIGS. 1 to 3 and that, after the attachment of the bolt element to the sheet metal part 140 in accordance with FIG. 7, the upper end face 139 of the head part 112 of the bolt element is slightly set back relative to the plane of the top side of the sheet metal part 140 in the illustration according to FIG. 7. One notes also from FIG. 7 that the axial thickness of the ring flange 114 is substantially smaller than the thickness of the sheet metal part 140. This is however in no way compulsory, but rather the ring flange 114 can be made thicker in the embodiment of FIG. 7 than the thickness of the sheet metal part 140 and the bolt element can thus be attached to the sheet metal part 140 in such a way that the ring surface 134 comes to lie approximately in the plane of the upper side of the sheet metal part 140, so that the end face 139 of the head part 112 is arranged significantly above the sheet metal part 140 and also realizes a spacer function here. The possibility also exists of realizing the ring flange 14 of the embodiment of FIGS. 1 to 3 in the way shown in FIG. 7.

Figure 7:
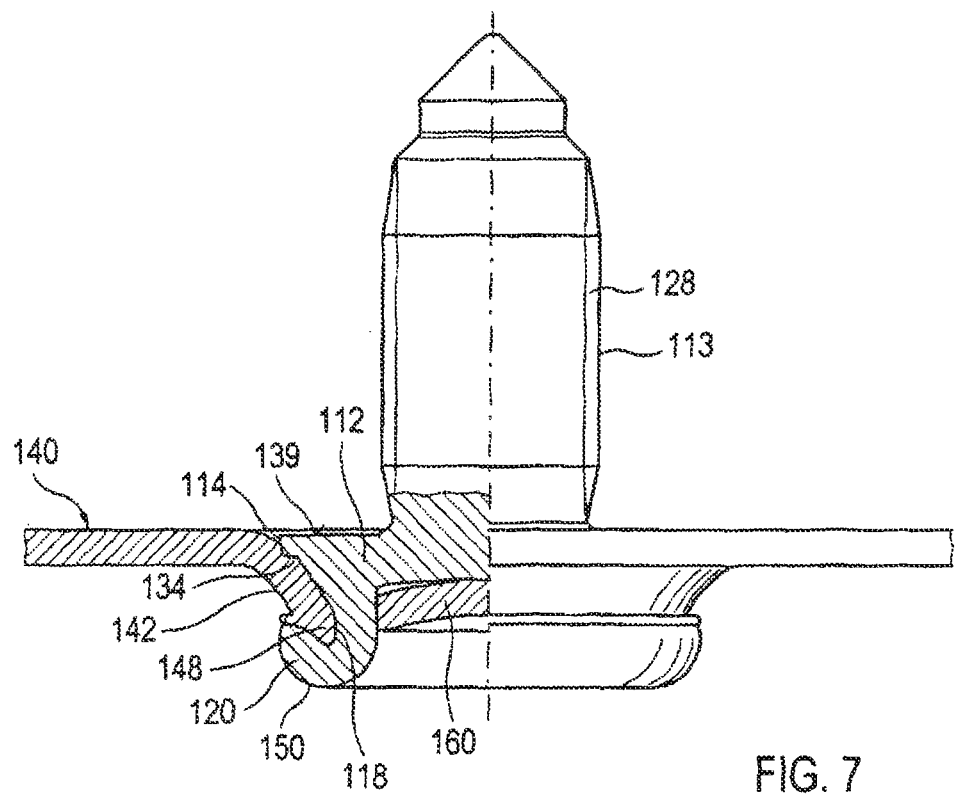
Figure 8:
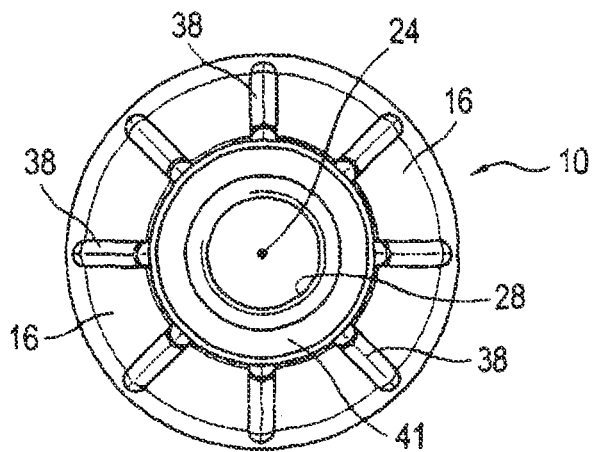
Figure 9:
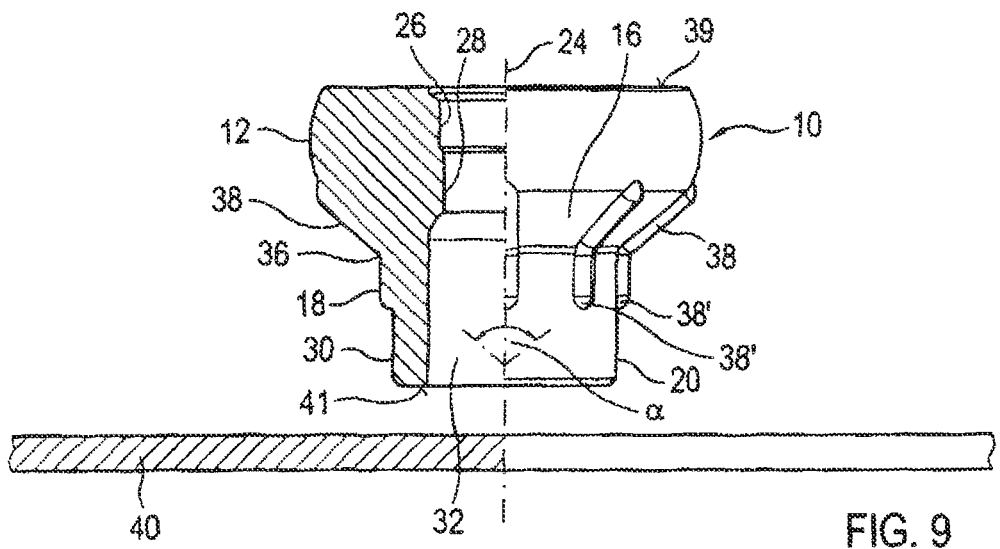

The ring bead 150 of FIG. 7 is also differently designed from the ring bead 50 of the functional element of FIGS. 1 to 3. Since the bolt element of FIGS. 4 to 7 is introduced in a self-piercing manner into the sheet metal part using the method in accordance with the German patent 34 47 006, the rivet section 120 is turned over after piercing the sheet metal part 140 by means of a corresponding shaping surface of the die that is used so that it adopts the rounded shape 150 which is shown in FIG. 7. In this arrangement the sheet metal part is also so deformed, as can likewise be seen from FIG. 7. On piercing of the sheet metal part a piercing slug 160 arises which, as is described in the above-named German patent, is fixedly clamped within the cylindrical recess 132 in the rivet section 120, whereby, on the one hand, the problem of removal of the piercing slug 160 is avoided and, on the other hand, an increased stiffness is achieved in the region of the head part 112. Despite this different formation of the ring bead 50 the sheet material 148 from the rim region of the pierced opening is also clampingly received here in the turned-over rivet section 120 and a compressive stress also arises here in the conical region 142 between the support surface 134 of the ring flange 114 and the clamping recess for the rim region 148 of the pierced hole formed by the rivet section 120, optionally together with the "throat part" 118.

Although the design of the rivet section 120 of the bolt element of the FIGS. 1 to 7 was designed in accordance with the rivet section of the customary SBF bolt this is not essential. One could for example make the design of this region in accordance with the design of the rivet section 20 of the functional element of FIGS. 1 to 3 and attach the bolt element of FIGS. 1 to 4 to the sheet metal part 40 with the same method which was described in connection with FIGS. 1 to 3. The possibility likewise exists of providing the functional element of FIGS. 1 to 3 with a cylindrical rivet section corresponding to the rivet section 120 of the bolt element of FIGS. 1 to 4 and of attaching the nut element into the sheet metal part either in a self-piercing manner or using a leading hole punch in manner known per se.

In the embodiment of FIGS. 1 to 7 a situation is also achieved here in which the sheet material is set under compressive stress in the conical region 142 so that, on the one hand, a formation of fatigue cracks may not be feared and, on the other hand, a very stiff high quality attachment of the functional element to the sheet metal part is ensured.

The FIGS. 8 to 11 show a further embodiment of a functional element in accordance with the invention and also the assembly situation with the sheet metal part and have a strong similarity to the embodiment of FIGS. 1 to 3. For this reason the same reference numerals are used in the FIGS. 8 to 11 as in the embodiment of FIGS. 1 to 3 and the description of the embodiment of FIGS. 1 to 3 applies equally for the embodiment of FIGS. 8 to 11 unless something is stated in the contrary. In other words the description of the FIGS. 1 to 3 in connection with the reference numerals used there applies in precisely the same way for the embodiment of FIGS. 8 to 11.

Figure 12:
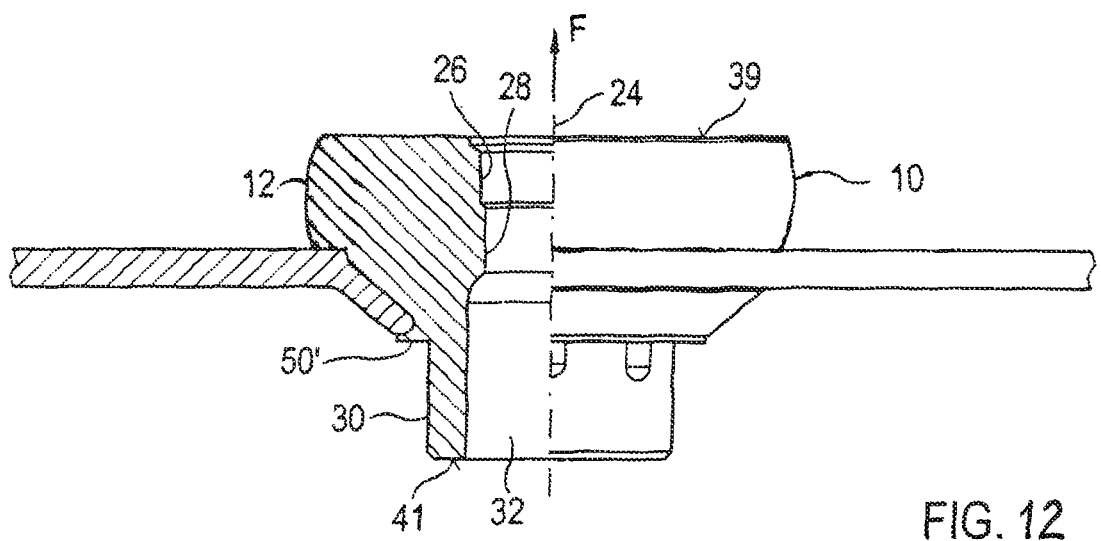
FIG. 12 shows a functional element having a ring flange.

As a first difference it is evident that the functional element 10 of FIGS. 8 to 11 has no ring flange but rather the conical surface 16 merges directly into the head part of the element. FIG. 12 shows the functional element of FIGS. 8 to 11 with a ring flange as shown at 34 in FIG. 1.

Furthermore it is evident from the Figures that the noses 38 providing security against rotation do not extend over the full length of the conical surface 16 in axial planes but rather extend further over the upper half (in FIG. 9) of the cylindrical section 20 where they end in rounded ends 38'.

In this embodiment the cylindrical section 20 is not provided with a throat part 18, although this would be possible if the functional element were not made self-piercing as is the case here.

In the embodiment of FIGS. 8 to 11 the free end face 41 is formed as a piercing section and enables the sheet metal part 40 to be pierced with the element itself. For this purpose the sheet metal part is supported above a die with a central bore which slidingly receives the cylindrical section 20 of the functional element 10, with this central passage merging via a ring shoulder extending perpendicular to the longitudinal axis 24 into a conical recess which corresponds to the shape of the outer surface of the conical formation of the conical collar of the sheet metal part. This conical recess of the die then merges into an end face of the die which in turn stands perpendicular to the longitudinal axis 24 of the die.

On piercing of the sheet metal part the sheet metal part is first conically dented by the end face 41 of the functional element and then a piercing slug is cut out of the base region of the conical dent and pressed by the free end face 41 of the cylindrical section 20 of the functional element 10 through the central passage of the die up to and into a free space from which the piercing slug can be removed.

Figure 10:
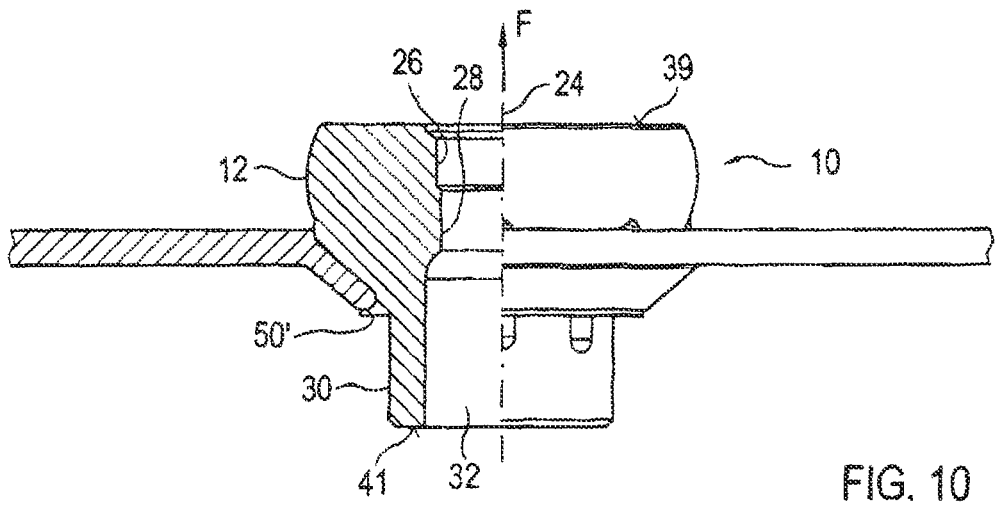
Figure 11:
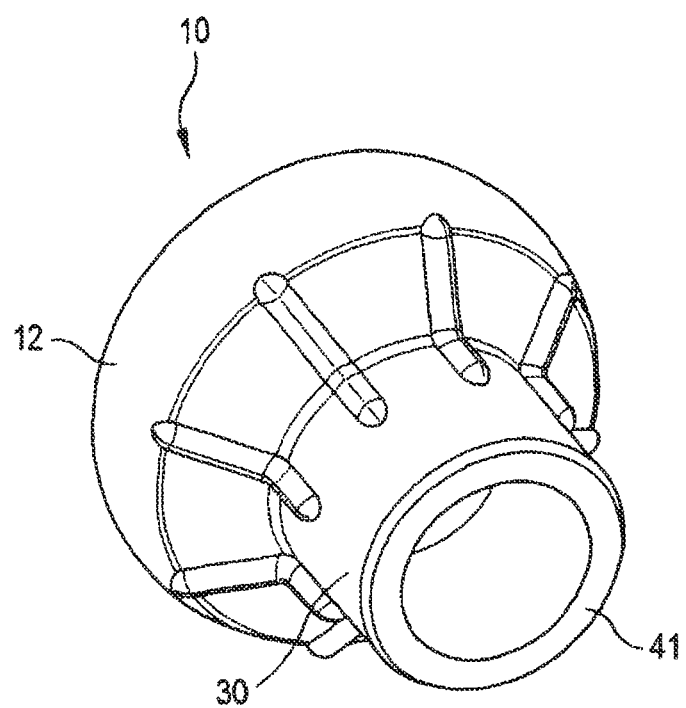

During this further movement of the functional element into the die the ring shoulder which extends perpendicular to the longitudinal axis of the die serves to so deform the material of the noses 38 providing security against rotation in the region of the cylinder section 20 that this material is reformed into radial projections at the positions of the previous noses providing security against rotation, with these material projections coming to lie over the rim region of the opening of the conical formation of the sheet metal part as indicated at 50' in FIG. 10 and preferably engaging in form-fitted manner into this rim region so that a security against rotation is not only present in the region of the conical surface of the functional element but rather also in the rim region of the opening of the conical formation of the sheet metal part.

One notes that the connection between the sheet metal part and the functional element is essentially present, as in the further embodiments, only in the region of the conical surface of the functional element.

Through the radial projections 50' one succeeds in achieving a very high pull-out or press-out resistance, i.e. against forces which act in the direction F of FIG. 10, in other words against forces which act in the axial direction of the functional element from the cylindrical section 20 in the direction of the body portion 12. Here the advantage also arises that when such pull-out forces act they attempt to press the conical formation of the sheet metal part flatter and the sheet metal part has a very high resistance to such forces, amongst other things because it is supported even more firmly against the element so that a very stable connection is present. Such forces can for example arise when a further component is to be screwed onto the upper end face 39 of the functional element 10 or exert corresponding forces onto the functional element after being screwed into place. In this embodiment there is also the possibility of screwing a further component onto the lower side of the sheet metal part 40 in FIG. 10, with the cylindrical section then serving as a guide or for centring. A further component to be screwed on must then normally have a shape which ensures good area contact with the sheet metal part 40 in the region of the conical formation. A further component of this kind can then be secured by a screw which is introduced into the thread cylinder 20 coming from below in FIG. 10, with measures normally being taken, for example via a spacer, to ensure that the further component contacts the sheet metal part 40 over a good area as a result of the screwing on forces.

The cylinder section 20 could also serve as a bearing spigot for a component which is to be rotatably secured to the element 10, wherein a component of this kind which is rotatably mounted is secured in the axial direction by the screw which is screwed axially into the thread 28.

The rounded ends 38' of the noses 38 providing security against rotation ensure that the sheet metal part is not impermissibly torn during the piercing process so that fatigue cracks are not to be feared in the sheet metal part of the positions of the noses providing security against rotation, i.e. at the positions of the radial projections 50'.

Although the functional element 10 of the FIGS. 8 to 11 is introduced into a self-piercing manner, the element can equally be inserted into a pre-holed component if this is desired.

An advantage of the functional element of the invention lies in the fact that with one element a wide range of sheet metal part thicknesses can be covered so that, for example, the functional element of FIGS. 8 to 11 can be used with sheet metal parts with thicknesses in the range 0.6 mm to 4 mm. These thickness particulars are not to be understood restrictively and are also not restricted to the embodiment of FIGS. 8 to 11.

The functional elements described here can for example be manufactured of all materials which reach the strength class 5.6 or higher. Such metal materials are normally carbon steels with 0.15 to 0.55% carbon content.

In all embodiments all materials can be named as an example for the material of functional elements which reach the strength values of class 8 in accordance with the Iso standard in the context of cold deformation, for example a 35B2 alloy in accordance with DIN 1654. The so-formed fastener elements are suitable, amongst other things, for all commercial steel materials for drawing quality sheet metal parts and also for aluminium or its alloys. Also aluminium alloys, in particularly those with higher strength can be used for the functional elements, for example AlMg5. Functional elements of higher strength magnesium alloys such, for example, AM50 can also be considered.

The invention claimed is:

1. Functional element (10; 110) for the attachment to a sheet metal part and comprising a head portion (12) which is of circular shape and which merges into a cylindrical rivet section (20), there being a transition from the head portion (12) into the rivet section (20) is formed by an at least substantially conical surface (16), which forms a contact surface for a corresponding conical region (42) of a sheet metal part (40); the conical surface having a first end remote from the head portion and a second end adjacent the head portion, the first end having a smaller diameter and the second end having a larger diameter and merging directly into the head portion of the functional element, the circular head portion having a maximum diameter equal to that of said larger diameter, whereby no ring flange is present between the head portion (12) and the conical surface, wherein a plurality of noses (12) providing security against rotation are provided at the conical surface of the functional element, extend over the full length of the conical surface in an axial plane and are uniformly distributed around the longitudinal axis of the functional element.

2. Component assembly comprising a functional element secured to a sheet metal part, the functional element having a head portion (12) which is of circular shape and which merges into a cylindrical rivet section, there being a transition from the head portion into the rivet section (20) formed by an at least substantially conical surface (16) which forms a contact surface for the sheet metal part (40), the conical surface (16) having a first end remote from the head portion and a second end adjacent the head portion, the first end having a smaller diameter and the second end having a larger diameter and merging directly into the circular head portion of the functional element, the head portion having a maximum diameter equal at most to that of said larger diameter, whereby no ring flange is present between the head portion (12) and the conical surface, the sheet metal part having a conical region (42) having an opening forming a rim, the conical region contacting the conical surface of the functional element, with at least one material projection (50) extending over the rim of the opening of the conical formation of the sheet metal part, wherein features (38) providing security against rotation are provided in the region of the conical surface of the functional element and in that the sheet material of the sheet metal part (40) is in form-locked engagement with the features providing security against rotation in the conical region (42) and wherein the noses (38) providing security against rotation extend along the conical surface of the functional element up to the rivet section (20) or up to a cylindrical portion (18) directly adjacent to the conical surface of the functional element at the first end of the conical surface.

3. Component assembly comprising a functional element secured to a sheet metal part, the functional element having a head portion (12) which is of circular shape and which merges into a cylindrical rivet section, there being a transition from the head portion into the rivet section (20) formed by an at least substantially conical surface (16) which forms a contact surface for the sheet metal part (40), the conical surface (16) having a first end remote from the head portion and a second end adjacent the head portion, the first end having a smaller diameter and the second end having a larger diameter and merging directly into the circular head portion of the functional element, the head portion having a maximum diameter equal at most to that of said larger diameter, whereby no ring flange is present between the head portion (12) and the conical surface, the sheet metal part having a conical region (42) having an opening forming a rim, the conical region contacting the conical surface of the functional element, with at least one material projection (50) extending over the rim of the opening of the conical formation of the sheet metal part, wherein the conical surface (16) of the functional element extends over at least substantially all the sheet metal which is in contact with the element after the riveting of the functional element to the sheet metal part.

4. Component assembly comprising a functional element secured to a sheet metal part, the functional element having a head portion (12) which is of circular shape and which merges into a cylindrical rivet section, there being a transition from the head portion into the rivet section (20) formed by an at least substantially conical surface (16) which forms a contact surface for the sheet metal part (40), the conical surface (16) having a first end remote from the head portion and a second end adjacent the head portion, the first end having a smaller diameter and the second end having a larger diameter and merging directly into the circular head portion of the functional element, the head portion having a maximum diameter equal at most to that of said larger diameter, whereby no ring flange is present between the head portion (12) and the conical surface, the sheet metal part having a conical region (42) having an opening forming a rim, the conical region contacting the conical surface of the functional element, with at least one material projection (50) extending over the rim of the opening of the conical formation of the sheet metal part, wherein features (38) providing security against rotation are provided in the region of the conical surface of the functional element and in that the sheet material of the sheet metal part (40) is in form-locked engagement with the features providing security against rotation in the conical region (42), wherein the features (38) providing security against rotation have the form of noses which are provided at the conical surface (16) and wherein a cylindrical portion (18) is provided directly adjacent to the conical surface of the functional element at the first end of the conical surface, wherein the noses providing security against rotation extend along the conical surface initially also extended along the cylindrical portion (18) and have been displaced in the axial direction in order to form individually outwardly extending material, with the material projections coming to lie at the rim of the opening of a conical formation of the sheet metal part.

* * * * *